United States Patent [19]

Stark

[11] Patent Number: 4,666,316
[45] Date of Patent: May 19, 1987

[54] ROLLER BEARING

[76] Inventor: James A. Stark, 300 Canterberry La., Oak Brook, Ill. 60521

[21] Appl. No.: 369,817

[22] Filed: Apr. 19, 1982

Related U.S. Application Data

[63] Continuation of Ser. No. 135,257, Mar. 31, 1980, abandoned.

[51] Int. Cl.$^4$ .............................................. F16C 29/06
[52] U.S. Cl. ...................................................... 384/44
[58] Field of Search ............... 308/6 R, 6 C, 202, 215, 308/216; 384/43, 44, 45, 50

[56] References Cited

U.S. PATENT DOCUMENTS

| | | | |
|---|---|---|---|
| 2,947,581 | 6/1960 | Van Dorn et al. | 308/216 |
| 3,003,828 | 10/1961 | Stark | 308/6 C |
| 3,101,978 | 8/1963 | Stallmon | 308/6 C |
| 3,341,262 | 9/1967 | Kalmanek | 308/6 C |
| 3,527,513 | 9/1970 | Hewko | 308/205 |
| 3,713,712 | 1/1973 | Derner et al. | 308/205 |

OTHER PUBLICATIONS

"Bendix Scully-Jones Tychoway Bearings" Bendix Industrial Tools Div. Bulletin 22-67, 12-69.
"Tychoway Linear Roller Bearings" Lucas Controls, 503 EFI, Issue No. 3.

Primary Examiner—Stuart S. Levy
Assistant Examiner—David Werner
Attorney, Agent, or Firm—Willian Brinks Olds Hofer Gilson & Lione Ltd.

[57] ABSTRACT

An improved recirculating roller bearing and a roller element therefor is disclosed in which the end members of the rollers have an axial bore within a portion of the cylindrical end member. The axial bore extends between 30% and 50% of the length, and between 20% and 30% of the diameter of the cylindrical end member.

3 Claims, 6 Drawing Figures

ROLLER BEARING

This application is a continuation of application Ser. No. 135,257, filed Mar. 31, 1980, now abandoned.

BACKGROUND AND SUMMARY OF THE INVENTION

This invention relates to an improvement in bearings and bearing rolling elements, and particularly in roller bearings and rollers for such bearings. More particularly, the invention relates to an improved recirculating roller bearing including an improved roller.

Recirculating roller bearings are well known in the art, and are described in U.S. Pat. Nos. 3,003,828 and 3,341,262. These bearings are used to provide substantially friction-free movement between two surfaces, at least one of which is linearly movable with respect to the other. A recirculating roller bearing is generally an elongated device, with two opposed flat faces, which can be secured at one of its faces to one surface, while its opposite face rests on an opposed movable surface.

A recirculating roller bearing generally includes a continuous raceway along its race body which is formed by a lower race, an upper race, and two opposed end return chambers that interconnect the upper and lower races. In a preferred form, the upper race is formed as a channel between two shoulders. The channel receives the rollers to avoid their contacting the adjacent upper surface. The lower race is at least partially open to allow rolling contact between the rollers and the adjacent lower surface. In cross-section, at a point between the end return chambers, the race body has a U-shaped configuration, the legs of the U being the shoulders that form the upper-race channel. The upper-race shoulders bear the load at the bearing's upper face, and the rollers disposed in the lower race bear the load at the bearing's lower face.

As used herein, the "upper portion" or the "top" of the bearing indicates that portion of the bearing which is immovably affixed to a surface. That upper portion is formed by two outer shoulders which over-extend the rollers and, hence, do not allow the rollers in the upper return chamber to contact the adjacent surface. Likewise, the "lower portion" or "bottom" of the bearing refers to that surface of the bearing which has exposed rollers surfaces and which movably contacts a surface which comes in contact with the bearing. It should be understood, however, that the recirculating bearing of the present invention can be operated in any orientation, and terms referring to the "top" or "bottom" are used for convenience only.

In a conventional recirculating roller bearing, the rollers normally have a dumbbell configuration with two cylindrical end members being joined by a mediate portion of reduced diameter. Those rollers are often referred to as center-guided rollers. For optimum performance, it is desirable that the rollers circulate in the race along a path precisely perpendicular to the axis of the race. This "straight rolling," is the optimum rolling condition because friction and its adverse effects, such as heat, wear, and the like, are kept to a minimum. Often, however, the rollers do not travel precisely perpendicular to the axis of the race. This condition, called "roller skewing," raises the level of friction in the system in two ways: first, an inner edge of the cylindrical end member registers with the guide in the lower race hence a mechanical friction developes as the two surfaces rub together; and second, a corrective force in the form of rotational torque is required to realign the roller. The total force needed to overcome the increased friction caused by roller skewing is called correctional torque, which is the total amount of torque needed to realign the skewed roller.

Roller skewing is a random phenomenon which is present in recirculating bearings regardless of load. However the incidence of this event increases with load so that, while a roller under a light load will skew, a roller under a heavier load will skew more often.

Generally, the present invention provides an improved recirculating roller bearing and roller therefor which more effectively neutralizes the effects of roller skewing by reducing the amount of corrective force needed to realign a roller into a straight rolling trajectory. In accordance with the invention, an improved recirculating roller bearing is provided having a race body with a continuous raceway in which a plurality of rollers circulate. The race body has upper and lower race channels and end return chambers at either end. The rollers are retained in the raceway in any suitable fashion. The rollers have two cylindrical end members joined by a mediate portion of reduced diameter. Each cylindrical end member has an axial bore extending from each end toward the mediate portion.

The inclusion of an axial bore in an otherwise solid cylindrical end member causes a shift in the distribution of mass in the roller toward the center. The reduced mass in the extremities results in a corresponding reduction in the amount of correctional torque needed to realign a skewed roller.

The axial bore described above yields two further advantages. First, under extreme loads, it has been found that the load tends to be concentrated at the outer ends of the rollers. This load concentration results from the distortion of the shape of the lower race under weight. The axial bore permits the rollers to distort more easily at the point of heaviest loading thus distributing the load more evenly.

Second, as a result of minor, but unavoidable, variations in the surface to which the recirculating bearing is attached, a greater percentage of the total load is often borne by one of the cylindrical end members. The axial bore permits the cylindrical end member bearing the greater load to distribute that load away from the roller extremities thus reducing wear and permanent deformation.

DETAILED DESCRIPTION OF THE INVENTION

Figure 1:
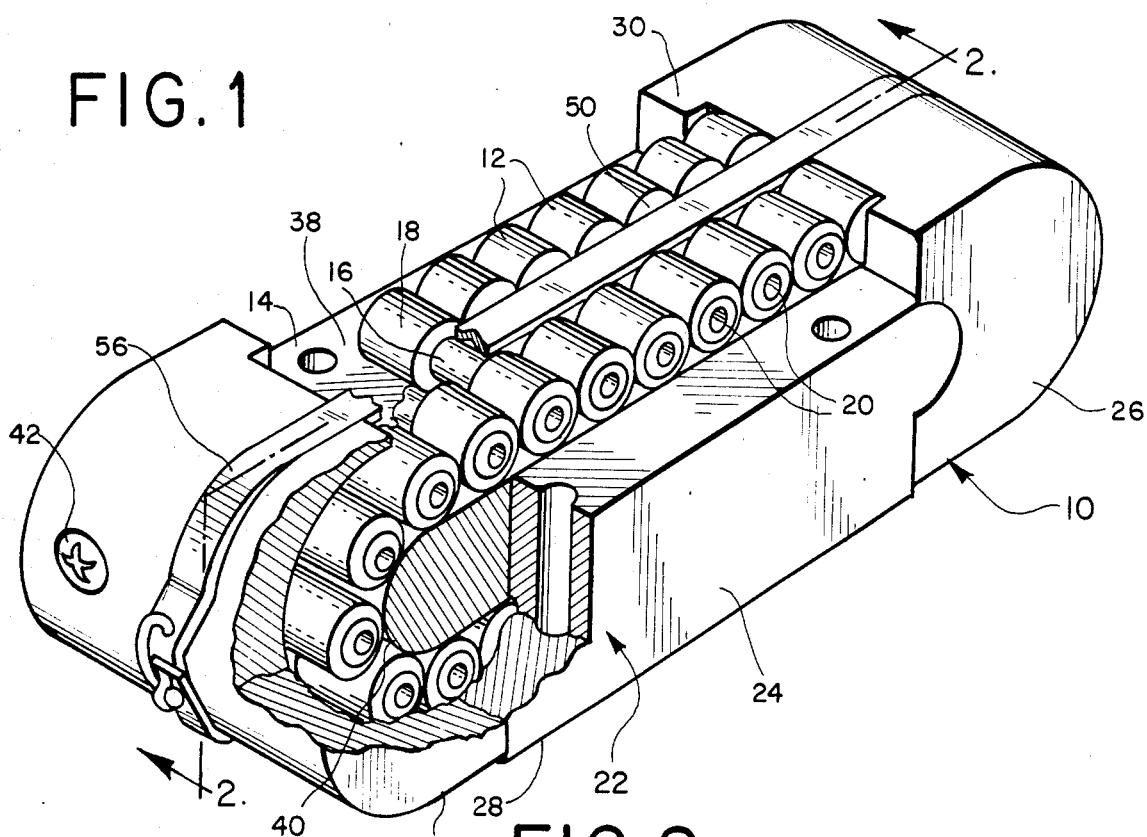
FIG. 1 is a partially cutaway, perspective view of a recirculating bearing embodying features of the present invention, in an inverted position with its lower face upward.

Referring now to the drawings, and particularly to FIG. 1, there is illustrated a recirculating bearing, designated generally by the reference numeral 10, which includes a plurality of rollers 12 disposed in a continuous raceway 14. The rollers 12 are each illustrated as including a mediate portion 16 interconnecting two cylindrical end members 18. Each roller 12 has axial bores 20 extending from each end partially through the cylindrical members 18 which reduce the torque necessary to realign a skewed roller, thereby minimizing friction caused by roller skewing.

Figure 2:
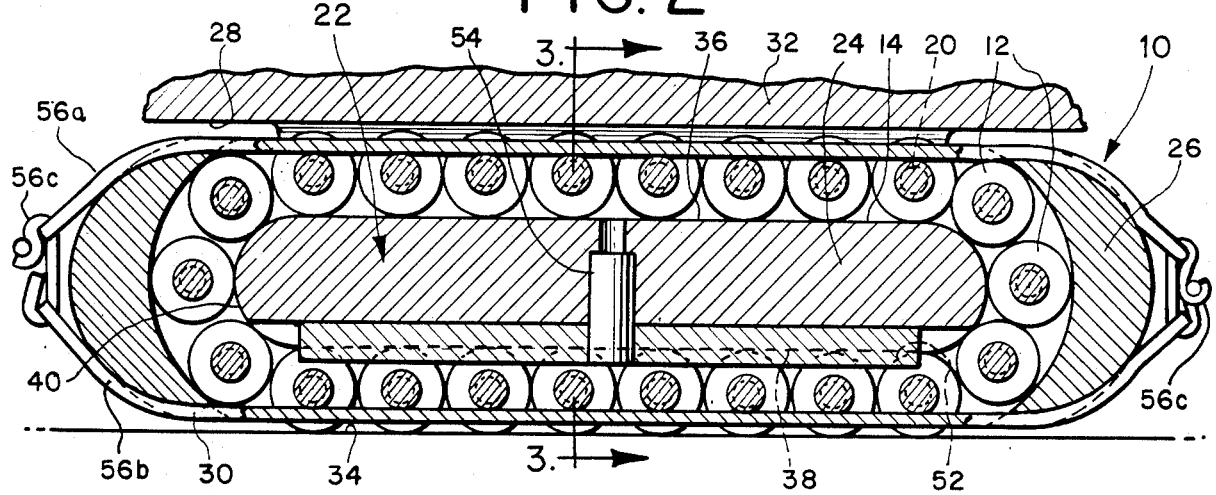
FIG. 2 is a cross-sectional view taken along plane 2—2 of FIG. 1, and showing the bearing disposed between two surfaces and positioned with its lower face downward.
Figure 3:
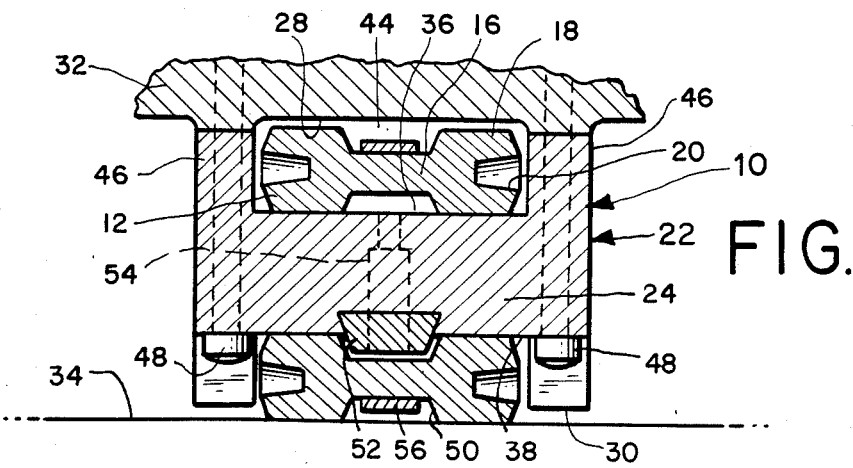
FIG. 3 is a cross-sectional view taken along plane 3—3 of FIG. 1.

Considering FIGS. 2 and 3 also, the recirculating bearing 10 has an elongated race body, designated generally by reference numeral 22, which includes a center portion 24 and two end portions 26, forming an upper bearing face 28 and a lower bearing face 30, adapted to be disposed adjacent, respectively, to a first and a second surface 32, 34. The bearing 10 is secured to the first surface 32 at its upper face 28 by means of screws 48, as illustrated, or by other suitable means of attachment.

The continuous raceway 14 is formed by an upper race 36 that extends along the upper face 28, a lower race 38 that extends along the lower face 30, and two end return chambers 40. The end return chambers 40 are enclosed by the end portions 26 of the race body 22, which end portions 26 are each secured to the center portion 24 by a screw 42, as illustrated, or other suitable means. The upper race 36 is formed as a channel 44 between two spaced upper-race shoulders 46. The shoulders 46 extend upwardly beyond the maximum diameter of the rollers 12 so as to avoid any contact between the rollers 12 and the adjacent first surface 32. The end portions 26 of the lower race 38 extend downward less than the maximum diameter of the rollers 12, to allow rolling contact between the rollers 12 and the adjacent second surface 34.

The mediate portion 16 of the rollers 12 has a reduced diameter. Along the lower race 38, the rollers 12 are guided by a center guide bar 52 that extends substantially the length of the lower race 38 and is received between the end members 18 of the rollers 12. The center guide bar 52 may be secured to the center portion 24 of the race body 22 by means of roll pin 54 or by any other suitable means. If a roller becomes misaligned or skewed, the inner shoulder 50 of its leading cylindrical member 18 will contact the side of the center guide bar 52. As will be discussed in more detail below, the torque necessary to realign the roller 12 is provided by the normal force of the centerguide bar 52.

Along both the upper and lower races 36, 38, an outer retaining means is provided to hold the rollers 12 in the races. The outer retaining means includes two metal strips 56a, 56b which receive the mediate portion 16 of the rollers 12. The metal strips 56a, 56b are joined by clasps 56c at each end section 26. Of course, one continuous strip would work equally as well but use of two strips allows the recirculating roller bearing to be more easily disassembled.

Loading at the upper face 28 of the bearing 10 is borne by the upper race shoulders 46; loading at the lower bearing face 30 is borne by the rollers 12 disposed therein. As best seen in FIG. 3, the center portion 24 of the race body 22 has a U-shaped cross-sectional configuration, the upper race shoulders 46 forming the legs of this U. The rollers 12 in the lower race 38 are positioned below the base of the U, between the spaced upper race shoulders 46.

Figure 4:
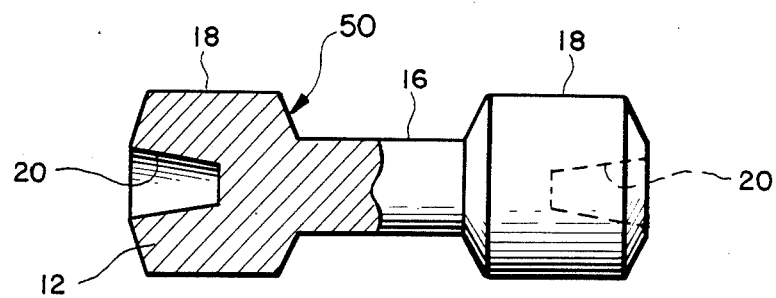
FIG. 4 is elevation view of a roller of the recirculating bearing of FIG. 1, shown partially in cross section.

Referring now to FIG. 4, a roller has axial bores 20 which extend from the end portions of said cylindrical end members 18 toward the mediate portion 16 of the roller 12. It has been found that roller skewing is most effectively reduced when the axial bore 20 extends between 30% and 50% of the cylindrical end member and has a diameter which is between 20% and 30% of the diameter of the cylindrical end member. Extension of the axial bore 20 beyond 50% of the length of the cylindrical end member 18 does not significantly reduce the amount of correctional torque required to correct roller skewing because, as explained in more detail below, redistribution of mass in the roller 12 is more effectively accomplished by removing mass at the extremities of the roller 12. Moreover, when the diameter of the axial bore 20 exceeds 30% of the outer diameter of the cylindrical end member 18, the cylindrical end members 18 tend to weaken, thus, adversely affecting the ultimate load carrying capacity of the recirculating roller bearing 10. Conversely, when the axial bore 20 extends less than 30% of the length of the cylindrical end member 18, or has a diameter of less than 20% of the outer diameter of the cylindrical end member, only a relatively small reduction in mass is realized, so that the optimum advantages of the present invention are not achieved. While the axial bores 20 are disclosed as having a frustro-conical configuration it should be recognized that other configurations, as, for example, a cylindrical bore, will perform equally as well.

For a recirculating roller bearing 10 as illustrated, the use of axial bores 20 partially through the cylindrical end members reduces the amount of correctional torque required to correct roller skewing. This is true because correctional torque is proportional to the amount of mass per unit distance over the entire length of the roller. The amount of correctional torque needed to correct roller skewing is reduced by providing axial bores 20 because the amount of mass per unit distance from the roller center is reduced.

This reduction in correctional torque is best understood in mathematical terms. The torque required to correct roller skewing is represented by a correction parameter R which represents a ratio of distances corresponding to torque analogs. In a conventional center-guided roller, the ratio is:

$$R = r_c/r_f$$

where
R is the correction ratio and:
$r_c$ (radius-of-correction) is the distance from the center of the roller to the inside edge of a cylindrical end member.
$r_f$ (radius-of-force) is the distance from the center of the roller to the center of load of the cylindrical end member.

As the value of R increases, correction of skewed rolling becomes more simple.

In a solid ended center-guided roller bearing $r_f$ is the distance from the center of the roller to the center of the cylindrical end member. However, when axial bores 20 are introduced, the center of load of the cylindrical end member shifts toward the center of the roller thus reducing the value of $r_f$ and yielding, for the sake of comparison, a new value, $r_f'$. A new correction parameter $R'$ is now calculated as follows:

$$R' = r_c/r_f'$$

in which $r_c$, a fixed physical parameter, remains unchanged, but $r_f'$ which is the distance from the center of the roller to the new center of load is less than $r_f'$. Since $r_f' < r_f$, $r_c/r_f' > r_c/r_f$ and $R' > R$.

Figure 5:
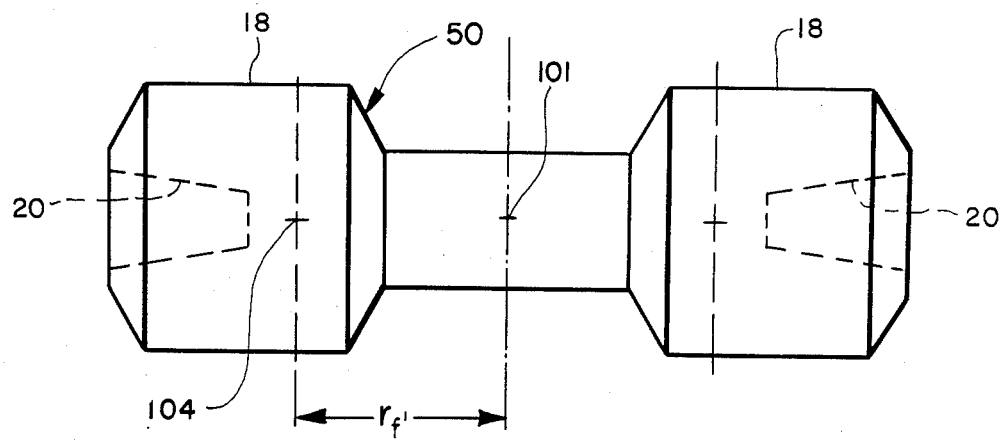
FIG. 5 is a diagrammatical illustration of the relationship of the radius-of-force and radius-of-correction parameters in a roller embodying features of the present invention.
Figure 6:
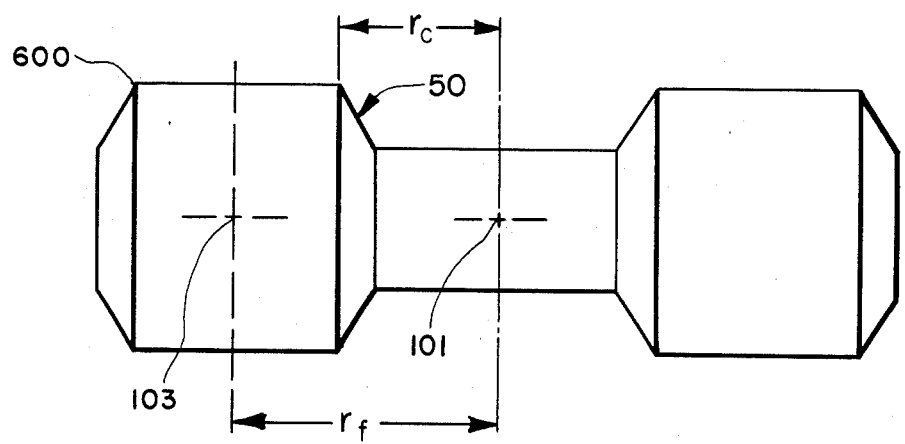
FIG. 6 is a diagrammatical illustration of the relationship of the radius of force and radius of correction parameters in a solid ended roller.

The calculation of the correction ratio R can be best understood with reference to FIGS. 5 and 6 in which roller 600 is solid. The value $r_c$ is the distance from the center of the roller 101 to the inner shoulder 50 of the cylindrical end member 18. The value $r_f$ is the distance from the center of the roller 101 to the center of load of the solid cylindrical end member 103 whereas the value $r_f'$ is the distance from the center of the roller 101 to the center of load 104 of the cylindrical end member 18 having an axial bore 20.

The increased value of the correction parameter demonstrates mathematically the physical effect of the shift in mass resulting in a lower correctional torque.

Obviously, many modifications and variations of the invention as set forth herein will occur to those skilled in the art, and it is intended to cover in the appended claims all such modifications and variations as fall within the true spirit and scope of the invention.

I claim:

1. An improved recirculating bearing comprising a race body having a continuous raceway with an upper race channel, a lower race channel, a first and second opposed return chamber interconnecting said upper and lower race channels, and a central guide strip extending along the low race channel;

a plurality of rollers disposed in said continuous raceway; and means for retaining said rollers in said continuous raceway, said upper race channel being formed by two shoulders having a height greater than the largest diameter of said rollers, said shoulders being adapted to bear a load at the upper race of the bearing, said rollers having two cylindrical end members interconnected by a mediate portion of reduced diameter and having an axial bore in each end member extending from the ends of said rollers toward said mediate portion;

wherein respective end members of each of the rollers are disposed on respective sides of the guide strip when in the lower race channel such that the guide strip cooperates with the end members to orient the rollers in the lower race channel; and wherein said axial bore extends between 30% and 50% of the length of each cylindrical end member.

2. The recirculating bearing defined in claim 1 in which the axial bore has a diameter between 20% and 30% of the diameter of the cylindrical end members.

3. An improved recirculating bearing comprising a race body having a continuous raceway with an upper race channel, a lower race channel, a first and second opposed return chamber interconnecting said upper and lower race channels, and a central guide strip extending along the lower race channel;

a plurality of rollers disposed in said continuous raceway; and means for retaining said rollers in said continuous raceway, said upper race channel being formed by two shoulders having a height greater than the largest diameter of said rollers, said shoulders being adapted to bear a load at the upper race of the bearing, said rollers having two cylindrical end members interconnected by a mediate portion of reduced diameter and having an axial bore in each end member extending from the ends of said rollers toward said mediate portion, wherein respective end members of each of the rollers are disposed on respective sides of the guide strip when in the lower race channel such that the guide strip cooperates with the end members to orient the rollers in the lower race channel; and wherein the axial bore has a diameter between 20% and 30% of the diameter of the cylindrical end members.

* * * * *